United States Patent
Manahan (10) Patent No.: US 9,428,312 B2
(45) Date of Patent: Aug. 30, 2016

(54) COVER RELEASE MECHANISMS FOR ENCLOSURES

(71) Applicant: Joseph Michael Manahan, Manlius, NY (US)

(72) Inventor: Joseph Michael Manahan, Manlius, NY (US)

(73) Assignee: Cooper Technologies Company, Houston, TX (US)

( * ) Notice: Subject to any disclaimer, the term of this patent is extended or adjusted under 35 U.S.C. 154(b) by 108 days.

(21) Appl. No.: 13/794,433

(22) Filed: Mar. 11, 2013

(65) Prior Publication Data

US 2014/0076897 A1   Mar. 20, 2014

Related U.S. Application Data (60) Provisional application No. 61/701,208, filed on Sep. 14, 2012.

(51) Int. Cl.
*B65D 43/26* (2006.01)
*B65D 43/22* (2006.01)
(Continued)

(52) U.S. Cl.
CPC .............. *B65D 43/22* (2013.01); *B65D 43/26* (2013.01); *B65D 45/24* (2013.01); *H02B 1/28* (2013.01); *H02K 5/00* (2013.01); *H02G 3/088* (2013.01); *Y10S 292/11* (2013.01); *Y10T 292/0911* (2015.04); *Y10T 292/0949* (2015.04);
(Continued)

(58) Field of Classification Search
CPC .... B65D 43/22; B65D 43/265; B65D 45/24; B65D 43/26
USPC ................................ 220/263, 325, 410, 285
See application file for complete search history.

(56) References Cited

U.S. PATENT DOCUMENTS

| 628,297 A | 7/1899 | Barr |
|---|---|---|
| 1,482,049 A | 1/1924 | Swanson |

(Continued)

FOREIGN PATENT DOCUMENTS

| CN | 102791168 | 11/2012 |
|---|---|---|
| EP | 0346290 | 12/1989 |

(Continued)

OTHER PUBLICATIONS

E. Kamaganova, Search and Written Opinion issued in International Application No. PCT/US2014/055237, completion date Nov. 27, 2014, 7 pages, Federal Institute of Industrial Property, Moscow, Russia.

(Continued)

*Primary Examiner* — Anthony Stashick
*Assistant Examiner* — Raven Collins
(74) *Attorney, Agent, or Firm* — King & Spalding LLP (57) ABSTRACT

An enclosure system that can include an enclosure cover comprising a receiving feature. The enclosure system can also include an enclosure body mechanically coupled to the enclosure cover. The enclosure system can further include a cover release mechanism mechanically coupled to the enclosure body and disposed, at least in part, within the receiving feature, where the cover release mechanism is movable between a first position and a second position. The enclosure cover and the enclosure body can be mechanically coupled to each other when the cover release mechanism is in the first position. The enclosure cover and the enclosure body can be, at least in part, separated from each other when the cover release mechanism moves to the second position from the first position.

6 Claims, 4 Drawing Sheets

(51) Int. Cl.
*B65D 45/24* (2006.01)
*H02B 1/28* (2006.01)
*H02K 5/00* (2006.01)
*H02G 3/08* (2006.01)

(52) U.S. Cl.
CPC ....... *Y10T292/108* (2015.04); *Y10T 292/1078* (2015.04); *Y10T 292/225* (2015.04)

(56) References Cited

U.S. PATENT DOCUMENTS

| | | |
|---|---|---|
| 1,836,949 A | 12/1931 | Balough |
| 2,360,826 A | 10/1944 | Cherry |
| 2,397,382 A | 3/1946 | Smith |
| 2,762,473 A | 9/1956 | Swerdlow |
| 3,349,947 A | 10/1967 | Zumwalt |
| 3,360,155 A | 12/1967 | Colonna |
| 3,362,573 A | 1/1968 | Wales, Jr. |
| 3,416,823 A | 12/1968 | Auer |
| 3,419,227 A | 12/1968 | Werkmeister et al. |
| 3,514,009 A | 5/1970 | Emery et al. |
| 3,901,122 A | 8/1975 | Novotny |
| 3,910,155 A | 10/1975 | Wilson |
| 3,974,933 A | 8/1976 | Toth et al. |
| 4,059,199 A | 11/1977 | Quaney |
| 4,139,118 A | 2/1979 | Parker |
| 4,157,146 A | 6/1979 | Svenson |
| 4,233,697 A | 11/1980 | Cornwall |
| 4,656,793 A | 4/1987 | Fons |
| 4,664,281 A * | 5/1987 | Falk et al. .................. 220/3.8 |
| 4,729,584 A | 3/1988 | Beckerer, Jr. |
| 4,902,046 A | 2/1990 | Maloberti |
| 5,004,129 A | 4/1991 | Loch et al. |
| 5,104,141 A | 4/1992 | Grove et al. |
| 5,322,178 A | 6/1994 | Foos |
| 5,346,090 A * | 9/1994 | Purohit et al. ............ 220/23.87 |
| 5,399,052 A | 3/1995 | Volkmann et al. |
| 5,413,441 A | 5/1995 | Heminger et al. |
| 5,534,664 A | 7/1996 | Fearing, Jr. |
| 5,657,892 A * | 8/1997 | Bolli et al. .................. 220/325 |
| 5,785,449 A | 7/1998 | Dibene |
| 5,888,140 A | 3/1999 | Klingler et al. |
| 6,302,416 B1 | 10/2001 | Schmack |
| 6,331,674 B1 | 12/2001 | Zolock et al. |
| 6,769,850 B2 | 8/2004 | Lay |
| 6,938,385 B2 | 9/2005 | Lind |
| 6,979,777 B2 | 12/2005 | Marcou et al. |
| 7,124,908 B2 | 10/2006 | Sanders |
| 7,341,144 B2 | 3/2008 | Tajiri |
| 7,877,948 B2 | 2/2011 | Davies |
| 8,123,065 B2 * | 2/2012 | Mitsuhashi ......... B01L 3/50825 220/200 |
| 2010/0147854 A1 | 6/2010 | Fauveau |
| 2010/0178887 A1 | 7/2010 | Millam |
| 2011/0131898 A1 | 6/2011 | Nies et al. |
| 2012/0160052 A1 | 6/2012 | Manahan et al. |

FOREIGN PATENT DOCUMENTS

| | | |
|---|---|---|
| EP | 1970604 | 9/2008 |
| JP | 08026314 | 1/1996 |
| JP | 08-233108 | 9/1996 |
| JP | 0932923 | 2/1997 |
| JP | 10-101108 | 4/1998 |
| JP | 2008105746 | 5/2008 |
| JP | 4847646 | 10/2011 |
| WO | 2011084152 | 7/2011 |

OTHER PUBLICATIONS

E. Kamaganova, Search and Written Opinion issued in International Application No. PCT/US2014/055234, completion date Nov. 27, 2014, 6 pages, Federal Institute of Industrial Property, Moscow, Russia.

* cited by examiner

COVER RELEASE MECHANISMS FOR ENCLOSURES

CROSS-REFERENCE TO RELATED APPLICATION

This application claims priority under 35 U.S.C. §119 to U.S. Provisional Patent Application Ser. No. 61/701,208, titled "Fastening Devices for Explosion-Proof Enclosures" and filed on Sep. 14, 2012, the entire contents of which are hereby incorporated herein by reference.

The present application is further related to U.S. patent application Ser. No. 13/793,672, titled "Fastening Devices for Explosion-Proof Enclosures," which is being filed concurrently with the U.S. Patent and Trademark Office, and whose entire contents are hereby incorporated herein by reference.

The present application is further related to U.S. patent application Ser. No. 13/793,774, titled "Fastening Devices for Explosion-Proof Enclosures," which is being filed concurrently with the U.S. Patent and Trademark Office, and whose entire contents are hereby incorporated herein by reference.

The present application is further related to U.S. patent application Ser. No. 13/794,402, titled "Fastening Devices for Explosion-Proof Enclosures," which is being filed concurrently with the U.S. Patent and Trademark Office, and whose entire contents are hereby incorporated herein by reference.

The present application is further related to World Intellectual Property Organization (WIPO) Patent Application Serial Number WO2011/084152, titled "Enclosure Clamps and Clamp Systems," filed on Jan. 5, 2010, and whose entire contents are hereby incorporated herein by reference.

TECHNICAL FIELD

The present disclosure relates generally to explosion-proof enclosures, and more particularly to systems, methods, and devices for securing a cover of an explosion-proof enclosure to a body of the explosion-proof enclosure.

BACKGROUND

Enclosures can be sealed (the enclosure cover is mechanically coupled to the enclosure body) for an extended period of time. In addition, or in the alternative, an enclosure can be located in an environment that exposes the enclosure to adverse conditions. For example, an enclosure can be located in an area that is subject to high temperatures, low temperatures, low humidity, and/or high humidity. As another example, an enclosure can be exposed to water (e.g., salt water, fresh water, well water). As another example, the enclosure can enclose one or more electrical devices that generate high levels of heat while operating.

As still another example, an enclosure can be exposed to various chemicals. Such chemicals can cause corrosion, which can have one or more of a number of forms. Examples of some types of corrosion can include, but are not limited to, general, localized (pitting or crevic), galvanic, and environmental. In such a case, these adverse conditions can cause the enclosure cover to become fused to the enclosure body, making it difficult for a user to open the enclosure without damaging the enclosure.

SUMMARY

In general, in one aspect, the disclosure relates to an enclosure system. The enclosure system can include an enclosure cover having a receiving feature, and an enclosure body mechanically coupled to the enclosure cover. The enclosure system can also include a cover release mechanism mechanically coupled to the enclosure body and disposed, at least in part, within the receiving feature, where the cover release mechanism is movable between a first position and a second position. The enclosure cover and the enclosure body can be mechanically coupled to each other when the cover release mechanism is in the first position. The enclosure cover and the enclosure body can be, at least in part, separated from each other when the cover release mechanism moves to the second position from the first position.

In another aspect, the disclosure can generally relate to an enclosure system. The enclosure system can include an enclosure cover, and an enclosure body mechanically coupled to the enclosure cover, where the enclosure body has a receiving feature. The enclosure system can also include a cover release mechanism mechanically coupled to the enclosure cover and disposed, at least in part, within the receiving feature, where the cover release mechanism is movable between a first position and a second position. The enclosure cover and the enclosure body can be mechanically coupled to each other when the cover release mechanism is in the first position. The enclosure cover and the enclosure body can be, at least in part, separated from each other when the cover release mechanism moves to the second position from the first position.

In yet another aspect, the disclosure can generally relate to a cover release mechanism. The cover release mechanism can include a device that is movably disposed within an aperture that traverses a flange of an enclosure, where the enclosure has an enclosure cover having a cover flange and an enclosure body having a body flange. The enclosure cover can be pried apart from the enclosure body as the device traverses the aperture.

In still another aspect, the disclosure can generally relate to a cover release mechanism. The cover release mechanism can include a mounting support rotatably coupled to a flange of an enclosure body and disposed within a cavity formed by an opposing flange. The cover release mechanism can also include a pry bar hingedly coupled to the mounting support at a hinge point along the pry bar, where the pry bar comprises a proximal end and a distal end. The distal end of the pry bar can separate the flange and the opposing flange when a force is applied to the proximal end of the pry bar.

These and other aspects, objects, features, and embodiments will be apparent from the following description and the appended claims.

BRIEF DESCRIPTION OF THE DRAWINGS

The drawings illustrate only example embodiments of cover release mechanisms for enclosures and are therefore not to be considered limiting of its scope, as cover release mechanisms for enclosures may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

The example embodiments discussed herein are directed to systems, apparatuses, and methods of releasing or separating a cover of an enclosure from a body of the enclosure. In other words, example cover release mechanisms can open an enclosure. The example embodiments discussed herein are with reference to any type of enclosure, including but not limited to explosion-proof enclosures, junction boxes, control panels, lighting panels, motor control centers, switchgear cabinets, relay cabinets, light fixtures, and fuse boxes. The enclosure can be secured using one or more of a number of securing devices, including but not limited to fasteners (e.g., bolts, screws), clips, mating threads, slots, tabs, brackets, and detents.

If an enclosure is subject to one or more standards and/or regulations, example devices used to open such an enclosure allow the enclosure to continue to be in compliance with such standards and/or regulations. For example, when the enclosure is an explosion-proof enclosure, such an explosion-proof enclosure is subject to meeting certain standards and/or requirements. For example, NEMA sets standards with which an enclosure must comply in order to qualify as an explosion-proof enclosure. Specifically, NEMA Type 7, Type 8, Type 9, and Type 10 enclosures set standards with which an explosion-proof enclosure within a hazardous location must comply. For example, a NEMA Type 7 standard applies to enclosures constructed for indoor use in certain hazardous locations. Hazardous locations may be defined by one or more of a number of authorities, including but not limited to the National Electric Code (e.g., Class 1, Division I) and Underwriters' Laboratories, Inc. (UL) (e.g., UL 1203). For example, a Class 1 hazardous area under the National Electric Code is an area in which flammable gases or vapors may be present in the air in sufficient quantities to be explosive.

As a specific example, NEMA standards for an explosion-proof enclosure of a certain size or range of sizes may require that in a Group B, Division 1 area, any flame path of an explosion-proof enclosure must be at least 1 inch long (continuous and without interruption), and the gap between the surfaces cannot exceed 0.0015 inches. Standards created and maintained by NEMA may be found at www.nema.org/stds and are hereby incorporated by reference. Example cover release mechanisms described herein and used to open the explosion-proof enclosure can maintain a flame path within the NEMA standards.

Each of the components of the example cover release mechanisms described herein can be made from one or more of a number of suitable materials, including but not limited to stainless steel, plastic, aluminum, ceramic, rubber, and iron. Example embodiments of cover release mechanisms for opening an enclosure will be described more fully hereinafter with reference to the accompanying drawings, in which example embodiments of cover release mechanisms for opening enclosures are shown. Cover release mechanisms for opening enclosures may, however, be embodied in many different forms and should not be construed as limited to the example embodiments set forth herein. Rather, these example embodiments are provided so that this disclosure will be thorough and complete, and will fully convey the scope of cover release mechanisms for opening enclosures to those or ordinary skill in the art. Like, but not necessarily the same, elements (also sometimes called components) in the various figures are denoted by like reference numerals for consistency.

FIGS. 1-4 show various enclosures with which example cover release mechanisms can be used. The enclosures with which the example cover release mechanisms can be used are not limited to the example enclosures shown in FIGS. 1-4. Further, the example enclosures are not limited to the configurations shown in FIGS. 1-4 and discussed herein.

Figure 1:
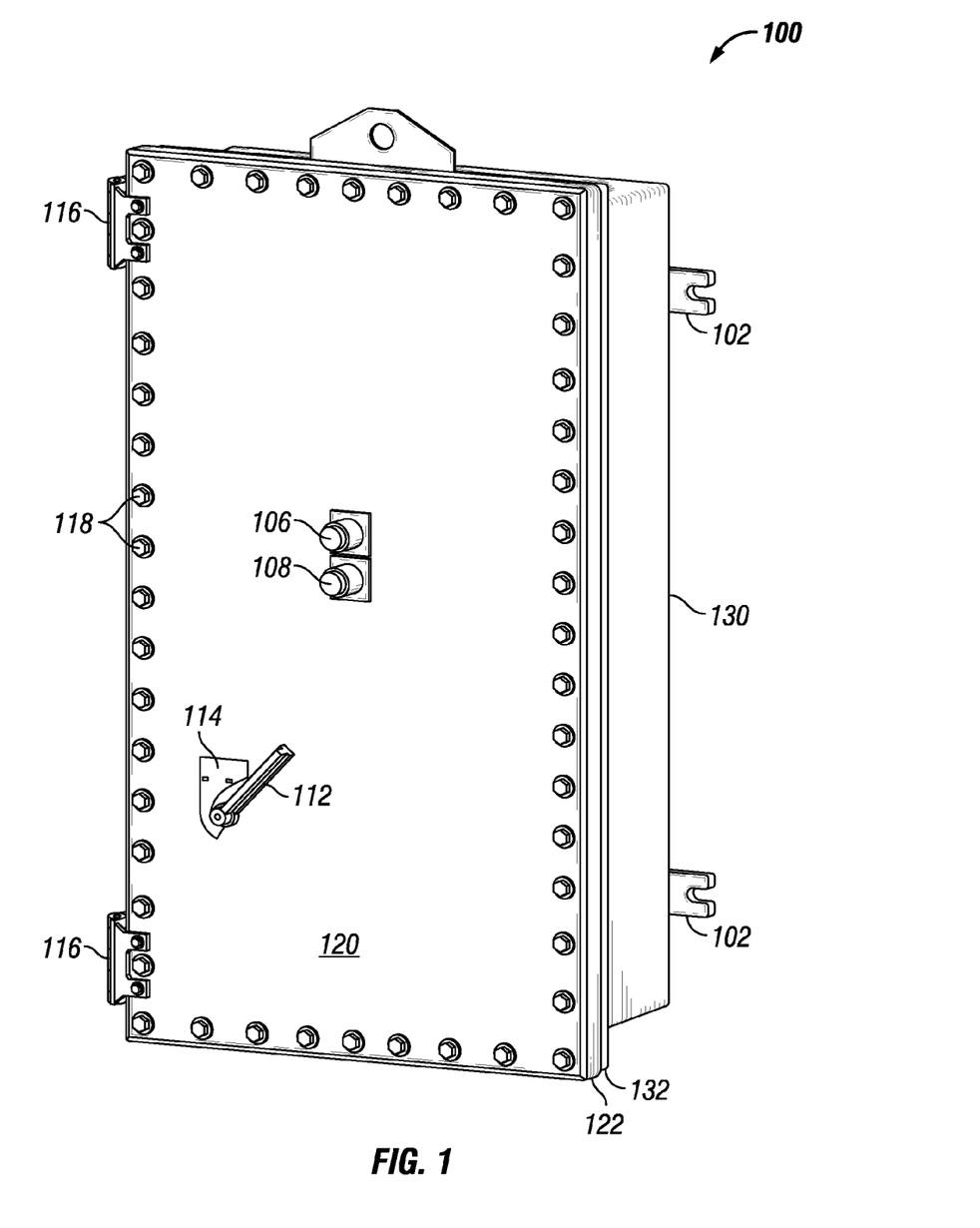
FIGS. 1-4 shows various example enclosures with which example cover release mechanisms can be used.

FIG. 1 shows an enclosure 100 that is an explosion-proof enclosure.

The enclosure 100 includes an enclosure cover 120 and a cover flange 122 around the perimeter of the enclosure cover 120. The cover flange 122 is mated to a body flange 132 that is positioned around the perimeter of the enclosure body 130. One or more hinges 116 may be positioned along one or more sides of the enclosure cover 120 and a corresponding side of the enclosure body 130. Alternatively, there may be no hinges 116 coupling the enclosure cover 120 to the enclosure body 130. In such a case, the enclosure cover 120 can be separated from the enclosure body 130 when the enclosure cover 120 is not fastened to the enclosure body 130.

The enclosure 100 shown in FIG. 1 is in a closed position is shown. The enclosure cover 120 (also called a door) is secured to the enclosure body 130 by a number of fastening devices 118 located at a number of points around the perimeter of the enclosure cover 120, where the cover flange 122 and the mating body flange 132 are located. In one or more example embodiments, a fastening device 118 may be one or more of a number of fastening devices, including but not limited to a bolt (which may be coupled with a nut), a screw (which may be coupled with a nut), and a clamp.

In addition, one or more hinges 116 are secured to one or more sides of the enclosure cover 120 along the cover flange 122 and a corresponding side of the enclosure body 130 along the body flange 132 so that, when all of the fastening devices 118 are removed, the enclosure cover 120 may swing outward (i.e., an open position) from the enclosure body 130 using some or all of the one or more hinges 116. In one or more example embodiments, there are no hinges, and the enclosure cover 120 is separated from the enclosure body 130 when all of the fastening devices 118 are removed.

The enclosure cover 120 and the enclosure body 130 may be made of one or more of a number of suitable materials, including metal (e.g., alloy, stainless steel), plastic, some other material, or any combination thereof. The enclosure cover 120 and the enclosure body 130 may be made of the same material or different materials. In one or more example embodiments, on the end of the enclosure body 130 opposite the enclosure cover 120, one or more mounting brackets 102 can be affixed to the exterior of the enclosure body 130 to facilitate mounting the enclosure 100. Using the mounting brackets 102, the enclosure 100 may be mounted to one or more of a number of surfaces and/or elements, including but not limited to a wall, a control cabinet, a cement block, an I-beam, and a U-bracket.

Optionally, the enclosure cover 120 may include one or more of a number of features that allow for user interaction while the enclosure 100 is sealed in the closed position. Examples of such features can include, but are not limited to, an indicating light (e.g., indicating light 1 106, indicting light 2 108), a switch handle 112, a viewing window, a pushbutton, and an indicating meter.

In certain example embodiments, the enclosure 100 can be "boltless" in place of the fastening devices 118 shown in FIG. 1. Examples of such "boltless" features to mechanically couple the enclosure cover 120 to the enclosure body 130 can be found in U.S. patent application Ser. Nos. 13/793,672, 13/793,774, and 13/794,402, each entitled "Fastening Devices for Explosion-Proof Enclosures," the entire contents of which are hereby incorporated by reference, and that are being filed concurrently with the U.S. Patent and Trademark Office.

Figure 2:
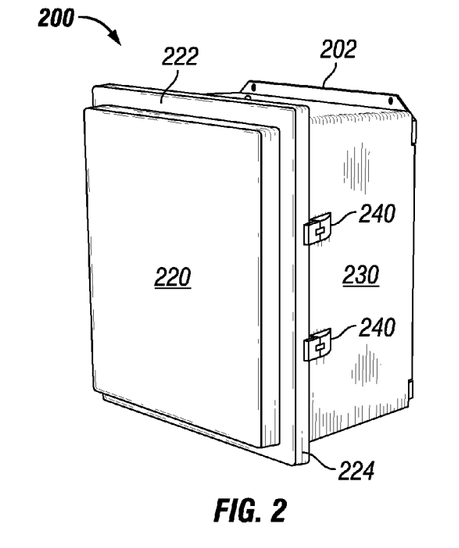

FIG. 2 shows an enclosure 200 that is a junction box. The enclosure 200 includes an enclosure cover 220 and an enclosure body 230. The enclosure cover 220 includes a cover flange 222 that extends along the perimeter of the enclosure cover 220. In this case, the cover flange 222 includes a collar 224 at the distal end of the cover flange 222 that extends away from the enclosure cover 220 at a substantially perpendicular angle from the enclosure cover 220. Similarly, the enclosure body 230 can include a body flange (hidden from view by the collar 224 of the cover flange 222) that extends along the perimeter of the wall at the opening of the enclosure body 230.

The near side of the enclosure 200 shown in FIG. 2 includes a clasp system 240, which is partially disposed on the collar 224 of the cover flange 222 and partially on a wall of the enclosure body 230. Opposite the side shown in FIG. 2 can be one or more hinges (which would allow the enclosure cover 220 to swing away from the enclosure body 230 along the hinge), one or more other clasp systems 240, some other fastening feature, or any combination thereof. The enclosure 200 shown in FIG. 2 also includes a mounting bracket 202 that is affixed to (or part of) the exterior of the enclosure body 230 to facilitate mounting the enclosure 200. Using the mounting bracket 202, the enclosure 200 may be mounted to one or more of a number of surfaces and/or elements, including but not limited to a wall, a control cabinet, a cement block, an I-beam, and a U-bracket.

Figure 3:
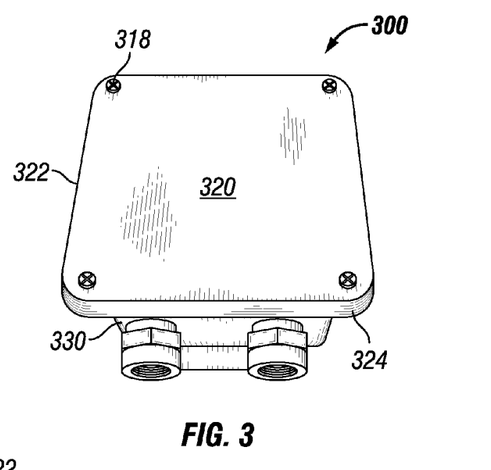

FIG. 3 shows an enclosure 300 that is a splice box, junction box, or through box. The enclosure 300 includes an enclosure cover 320 and an enclosure body 330. The enclosure cover 320 includes a cover flange 322 that extends along the perimeter of the enclosure cover 320. In this case, the cover flange 322 includes a collar 324 at the distal end of the cover flange 322 that extends away from the enclosure cover 320 at a substantially perpendicular angle from the enclosure cover 320. Similarly, the enclosure body 330 can include a body flange (hidden from view by the collar 324 of the cover flange 322) that extends along the perimeter of the wall at the opening of the enclosure body 330.

Along the face of the enclosure cover 320 toward the cover flange 322 of the enclosure 300 shown in FIG. 3 is one fastening device 318 (in this case, a screw) in each corner of the enclosure cover 320. Each fastening device 318 can protrude through an aperture in the cover flange 322 and a corresponding aperture that traverses at least part of the body flange. Optionally, hidden from view, one or more hinges (which would allow the enclosure cover 320 to swing away from the enclosure body 330 along the hinge) and/or other fastening feature can be disposed between the enclosure cover 320 and the enclosure body 330 to mechanically couple the enclosure cover 320 to the enclosure body 330.

Figure 4:
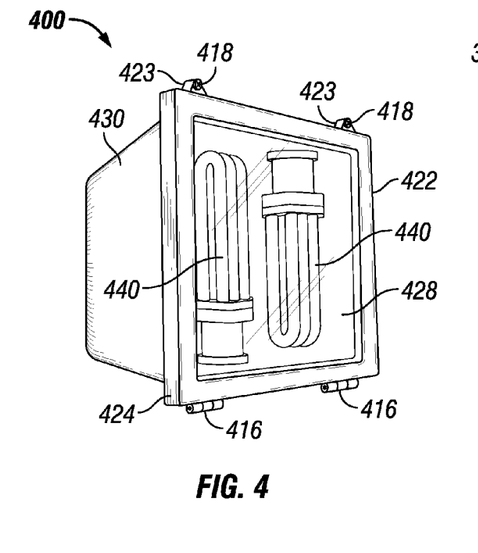

FIG. 4 shows an enclosure 400 that is a lighting fixture. The enclosure 400 includes an enclosure cover 420 and an enclosure body 430. The enclosure cover 420 includes a cover flange 422 that extends along the perimeter of the enclosure cover 420. In this case, the cover flange 422 includes a collar 424 at the distal end of the cover flange 422 that extends away from the enclosure cover 420 at a substantially perpendicular angle from the enclosure cover 420. Similarly, the enclosure body 430 can include a body flange (hidden from view by the collar 424 of the cover flange 422) that extends along the perimeter of the wall at the opening of the enclosure body 430.

The face of the enclosure cover 420 in FIG. 4, inside the perimeter defined by the cover flange 422, is a diffuser 428 that manipulates light generated by the one or more light sources 440 positioned inside the enclosure 400. Along the top end of the cover flange 422 of the enclosure 400 are a pair of protruding portions 423 that are each traversed by an aperture. In addition, hidden from view, the body flange 432 can include a corresponding pair of protruding portions with apertures that traverse at least a portion of the protruding portion. As shown in FIG. 4, a fastening device 418 (in this case, a screw) can protrude through the aperture in a protruding portion 432 and the aperture in the corresponding protruding portion in the body flange. Such fastening devices 418 can be used to mechanically couple the enclosure cover 420 to the enclosure body 430.

Further, one or more hinges 416 can be disposed along one or more edges of the cover flange 432 and/or the body flange. In this case, two hinges 416 are disposed on the bottom end of the cover flange 422 and the body flange. The hinges 416 allow the enclosure cover 420 to swing away from the enclosure body 430 along the hinges 416 when the fastening devices 418 do not traverse the aperture in the protruding portion 432 of the cover flange 422 and the aperture in the corresponding protruding portion of the body flange.

FIGS. 5 and 6A-6C show example cover release mechanisms that can be used with enclosures. A cover release mechanism is used to assist in prying apart the enclosure cover from the enclosure body. Such a cover release mechanism can be useful when oxidation has formed between the cover flange and the body flange. In such a case, an improper method of prying apart the enclosure cover and the enclosure body can result in damage (e.g., scoring, pitting, gouging) to the cover flange and/or the body flange.

When such damage occurs, the mechanical integrity of the enclosure can be compromised. For example, if the enclosure is an explosion-proof enclosure, the flame path between the enclosure flange and the body flange can be compromised, and the enclosure may no longer meet the required standards. The cover release mechanism can be one or more devices made of one or more components. The enclosures that include example cover release mechanisms are not limited to the example enclosures shown in FIGS. 5 and 6A-6C. Further, the example cover release mechanisms used with an enclosure are not limited to the configurations shown in FIGS. 5 and 6A-6C and discussed herein.

Figure 5:
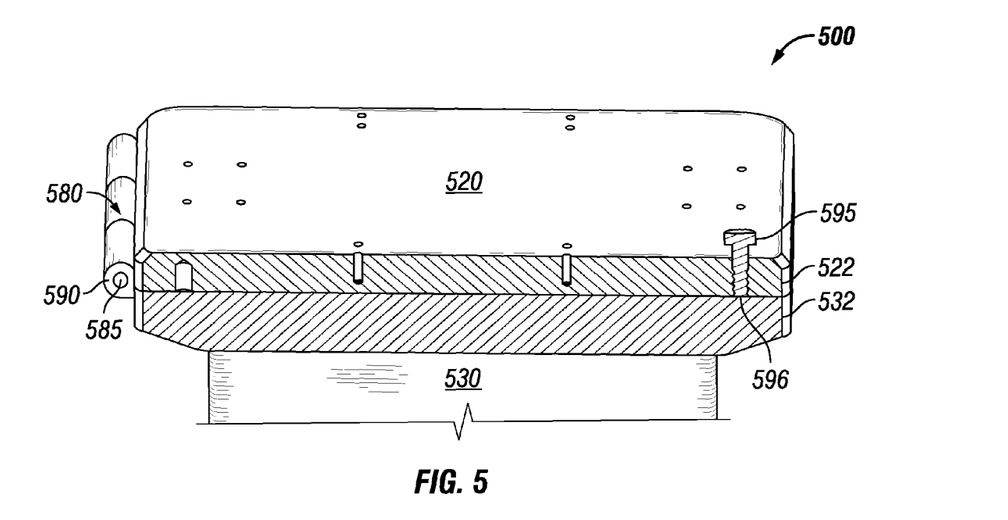
FIG. 5 shows a cross-sectional side view of an example cover release mechanism for an enclosure in accordance with certain example embodiments.

FIG. 5 shows cross-sectional side view of an example cover release mechanism 595 for an enclosure 500 in accordance with certain example embodiments. The enclosure 500 shows an enclosure cover 520 that is hingedly coupled to the enclosure body 530 by a hinge assembly 580. The hinge assembly 580 can include two or more knuckles 590 that are each mechanically coupled to the proximal end of a wing (not shown). The distal end of each wing is mechanically coupled to the cover flange 522 of the enclosure cover 520 or the body flange 532 of the enclosure body 530. Each knuckle 590 forms a cavity, and when each wing is mechanically coupled to the cover flange 522 or body flange 532, the knuckles 590 align to form a single long cavity through which the pin 585 can be inserted to enable the hinging capability of the hinge assembly 580.

In certain example embodiments, the cover release mechanism 595 is a device that separates the enclosure cover 520 from the enclosure body 530. In this case, the cover release mechanism 595 of the enclosure 500 of FIG. 5 is a screw that is threadably coupled to an aperture 596 (generally called a receiving feature) that traverses the cover flange 522 of the enclosure cover 520. Specifically, the cover release mechanism 595 is threaded, and mating threads are disposed along the surface that defines the aperture 596. In certain example embodiments, the mating surface of the body flange 532 has no aperture.

By driving the cover release mechanism 595 through the aperture 596 in the cover flange 522, when the cover release mechanism 595 meets the mating surface of the body flange 532, a separation is forced between the body flange 532 and the cover flange 522. In other words, as the cover release mechanism 595 extends through the aperture 596 in the cover flange 522 and contacts the body flange 532, the cover release mechanism 595 pries the enclosure cover 520 from the enclosure body 530.

There can be one or multiple apertures 596 disposed at various locations along the perimeter of the cover flange 522. In cases where the enclosure 500 includes a hinged connection, as with the hinge assembly 580 shown in FIG. 5, the cover release mechanism 595 can be located at an end that is opposite from where the hinge assembly 580 is located. In addition, or in the alternative, as shown in FIG. 5, the cover release mechanism 595 can be located on a side adjacent to the side where the hinge assembly 580 is positioned. In such a case, the cover release mechanism 595 is located some distance away from the side of the hinge assembly 580 so that the leverage utilized by the cover release mechanism 595 in prying apart the enclosure cover 520 from the enclosure body 530 is increased.

The cover release mechanism 595 can be threadably coupled to the cover flange 522 at all times (e.g., during normal operation of the enclosure 500). Alternatively, the cover release mechanism 595 can be inserted into the aperture 596 only when a user is attempting to separate the cover 520 from the body 530. In such a case, the aperture 596 can be uncovered or a plug can be placed in the aperture 596 to keep the threads in the wall that defines the aperture 596 relatively undisturbed. In this example, when the cover release mechanism 595 does not make contact with mating surface of the flange opposite that in which the cover release mechanism 595 is disposed, the cover release mechanism 595 can be said to be in a first position.

In certain example embodiments, the cover release mechanism 595 is oriented in the opposite way. In other words, the cover release mechanism 595 of the enclosure 500 of FIG. 5 can be threadably coupled to an aperture that traverses the body flange 532 of the enclosure body 530. In such a case, the mating surface of the cover flange 522 would have no aperture. By driving the cover release mechanism 595 through the aperture in the body flange 532, when the cover release mechanism 595 meets the mating surface of the cover flange 522 (i.e., when the cover release mechanism 595 is in a second position), a separation is forced between the body flange 532 and the cover flange 522.

In certain example embodiments, the cover release mechanism 595 can be coupled to an aperture in the side of the body flange 532 and/or the body flange 522. In such a case, the cover release mechanism 595 can, when inserted into the aperture, drive a wedge or some other component between the body 530 and the cover 520 at a prescribed location. When a force is applied to the wedge by the cover release mechanism 595, the wedge forces the body 530 and the cover 520 apart from each other. The angle at which the cover release mechanism 595 is disposed within the body flange 532 and/or the cover flange 522 can be at any angle. For example, as shown in FIG. 5, the angle at which the cover release mechanism 595 is disposed within the cover flange 522 is approximately 90°.

The cover release mechanism 595 in FIG. 5 can have one or more of a number of receiving features at its head, disposed on the top surface and/or the side of the cover release mechanism 595. Such receiving features can be used to receive a tool for moving the cover release mechanism 595 between, and including, a first position and a second position. Such receiving features can include, but are not limited to, one or more slots (as for receiving a screwdriver), squared features along the outer side surface (as for receiving a wrench or socket), and a shaped and hollowed cavity (as for receiving a key). The threads can be of any size and/or dimensions that mate with the complementary threads disposed along the wall that forms the aperture 596. For example, the threads can be ¼ threads.

Figure 6A:
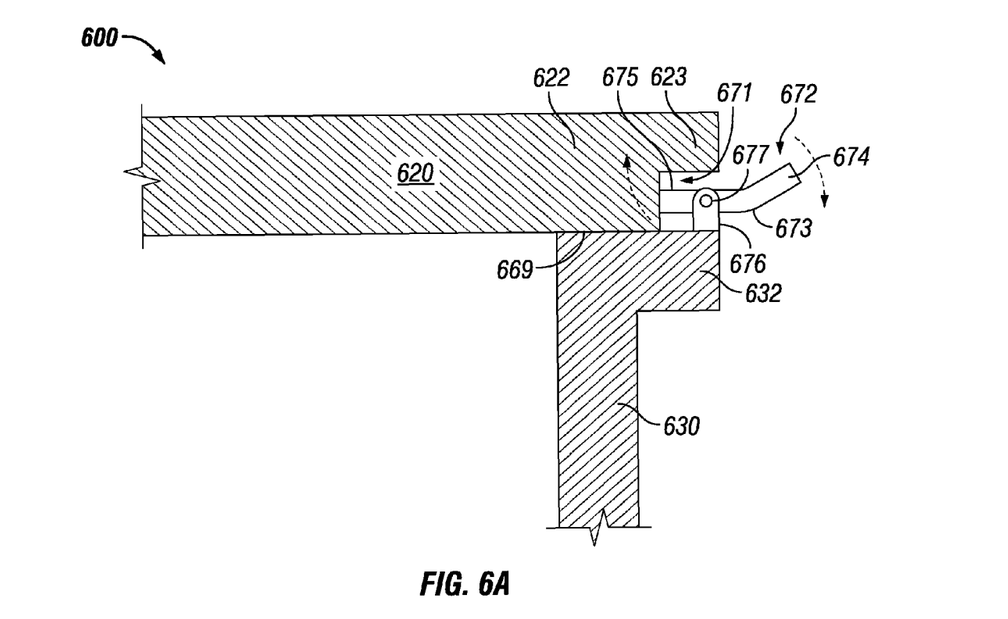
FIGS. 6A-6C show an alternative example cover release mechanism for an enclosure in accordance with certain example embodiments.
Figure 6B:
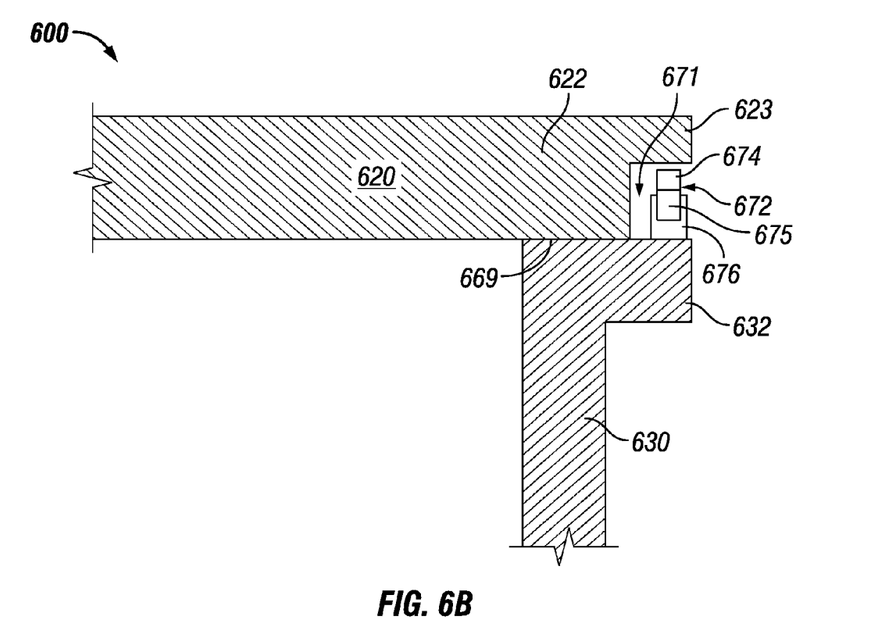
Figure 6C:
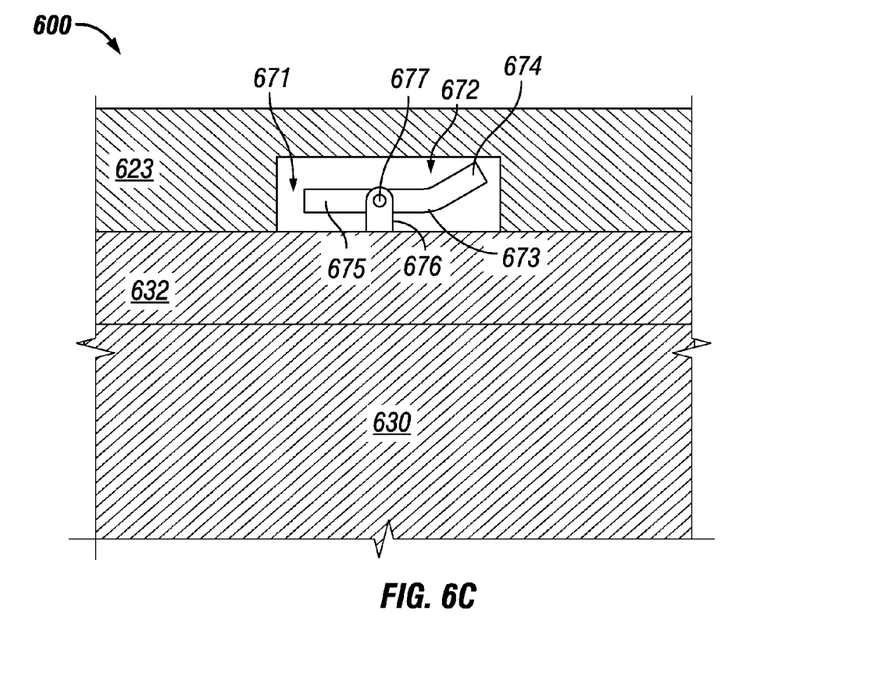

FIGS. 6A-6C show an alternative example cover release mechanism 672 for an enclosure 600 in accordance with certain example embodiments. Specifically, FIG. 6A shows a cross-sectional side view of the cover release mechanism 672 in a usable position. FIG. 6B shows a cross-sectional side view of the cover release mechanism 672 in a hidden position. FIG. 6C shows a front view of the cover release mechanism 672 in a hidden position. The device that is the cover release mechanism 672 of the enclosure 600 in this case is a pry bar 673 that is hingedly coupled to a mounting support 676 (generally called a receiving feature) that is positioned within a cavity formed between a cutout extension 623 and the base flange 632. The hinged coupling between the pry bar 673 and the mounting support 676 can be achieved in one or more of a number of ways. In this example, the pry bar 673 is hingedly coupled to the mounting support 676 using a pin 677 that traverses both the pry bar 673 and the mounting support 676.

The mounting support 676 in this example is mounted (e.g., fixedly and rotatably coupled to, as on a swivel) to the base flange 632. Alternatively, the mounting support 676 can be mounted to the cover flange 622. In such a case, a cutout extension (forming a cavity 671) would be part of the body flange 632. In certain example embodiments, the enclosure 600 has more than one cover release mechanism 672, of the same or different type (e.g., screw, pry bar). The description here is made with respect to the mounting support 676 being mounted to the base flange 632, as shown in FIGS. 6A-6C.

As shown in FIGS. 6B and 6C, in a normal (non-usage or hidden) state, the pry bar 673 can be positioned, using the rotatable capability of the mounting support 676, lengthwise within a cavity 671 formed between the base flange 632 and a cutout extension 623 of the cover flange 622. In the event that the enclosure 600 is an explosion-proof enclosure, to account for the cavity 671 under the cutout extension 623, the adjacent cover flange 622 can be altered to provide the flame path 669 required for the enclosure 600. Similarly, other alterations can be made to one or more portions of the enclosure cover 620 and/or the enclosure body 630 so that the enclosure 600 with the cover release mechanism 672 is in compliance with any other applicable standard and/or regulation.

In certain example embodiments, as shown in FIGS. 6B and 6C, the pry bar 673 is positioned, using the mounting support 676, within the cavity 671 when the pry bar 673 is not in use. In such a case, the cover release mechanism 672 can be said to be in a first position or a normal state. To use the cover release mechanism 672, the proximal end 674 of the pry bar 673 is rotated approximately 90° away from the enclosure 600, as shown in FIG. 6A, into a usable position. In this usable position, the distal end 675 of the pry bar 673 remains positioned inside the cavity 671. When a downward (or in some cases upward) force is applied to the proximal end 674 of the pry bar 673, the distal end 675 of the pry bar 673 is moved in the opposite direction because of the hinged coupling of the pry bar 673 with the mounting support 676.

As the proximal end 674 of the pry bar 673 continues to be forced downward, the distal end 675 of the pry bar 673 is moved toward the bottom surface of the cutout extension 623 until the distal end 675 of the pry bar 673 makes contact with the bottom surface of the cutout extension 623. As additional downward force is applied to the proximal end 674 of the pry bar 673, putting the cover release mechanism 672 in a second position, the distal end 675 of the pry bar 673 forces the cutout extension 623 to move upward, causing a separation between the cover 620 and the base 630.

For the example shown in FIG. 6A, when the cover release mechanism 672 is in the usable position and a downward force is applied to the proximal end 674 of the pry bar 673, the distal end 675 of the pry bar 673 applies an upward force to the cutout extension 623 of the cover flange 622. If the cover release mechanism 672 is inverted and mounted to the cover flange (or the cutout extension 623 of the cover flange 622), when an upward force is applied to the proximal end 674 of the pry bar 673, the distal end 675 of the pry bar 673 applies a downward force to the base flange 632 (or a cutout extension of the base flange 632, if any).

In certain example embodiments, the pry bar 673 can include one or more of a number of features to assist in prying the enclosure cover 620 from the enclosure base 630. For example, a protrusion extend from the pry bar 673 proximate to the cutout extension 623. Such a protrusion can make contact with the cutout extension 623 when the distal end 675 of the pry bar 673 makes contact with the base flange 630 when an upward force is applied to the proximal end 674 of the pry bar 673.

The hinged coupling between the pry bar 673 and the mounting support 676 can be positioned at one or more of a number of locations (also called a hinge point) along the pry bar 673. In certain example embodiments, the coupling between the pry bar 673 and the mounting support 676 occurs at any point other than an extreme end of the pry bar 673. The location along the pry bar 673 where the pry bar 673 is hingedly coupled to the mounting support 676 can be based on one or more of a number of factors, including but not limited to the depth of the cavity 671, the height of the cavity 671, the thickness of the pry bar 673, and the material of the pry bar 673. In certain example embodiments, the hinge point is positioned along the pry bar 673 closer to the distal end 675 than the proximal end 674.

The cover release mechanisms (or certain components thereof) described herein can be made of one or more of a number of suitable materials (e.g., stainless steel, rubber, nylon). Further, the cover release mechanisms (or certain components thereof) can have one or more of a number of features that can be used to separate the cover from the body while causing minimal or no damage to any portions of the enclosure. In addition, the use of an example cover release mechanism with an enclosure that is subject to one or more of a number of regulations and/or standards allows the enclosure to continue meeting those regulations and/or standards. For example, if the enclosure is an explosion-proof enclosure, the flame path of the enclosure can be maintained, even with the cover release mechanism. As another example, if the enclosure has a weather sealing surface and is rated as such, example cover release mechanisms can ensure compliance with such a rating. In certain example embodiments, for the cover release mechanism 672 of FIGS. 6A-6C, the distal end 675 of the pry bar 673 can include a rubber-coated tip and/or be made of nylon to prevent the distal end 675 of the pry bar 673 from scratching the bottom surface of the cutout extension 623.

Example embodiments of cover release mechanisms provide a way to pry apart an enclosure cover from an enclosure body while having little or no damaging effect (e.g., scoring, gouging) on one or more portions of the enclosure. The use of example cover release mechanisms can be employed if an enclosure cover and an enclosure body, once released of any mechanical couplings, cannot easily separate from each other. Causes of such a problem can include, but are not limited to, corrosion (also called oxidation), melted rubber (as with a deteriorated gasket), and an adhesive. Some example embodiments of cover release mechanisms can be utilized without special tools, instead using, for example, one or both hands of a user. Further, example cover release mechanisms can be used with enclosures that are required to meet one or more of a number of standards and/or regulations and still allow the enclosures to continue to meet such standards and/or regulations.

Accordingly, many modifications and other embodiments set forth herein will come to mind to one skilled in the art to which cover release mechanisms for enclosures pertain having the benefit of the teachings presented in the foregoing descriptions and the associated drawings. Therefore, it is to be understood that cover release mechanisms for enclosures is not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A cover release mechanism for an enclosure, comprising:
 a mounting support rotatably coupled to a flange of the enclosure and disposed within a cavity formed by an opposing flange; and
 a pry bar hingedly coupled to the mounting support at a hinge point along the pry bar, wherein the pry bar comprises a proximal end and a distal end,
 wherein the distal end of the pry bar pushes a cover of the enclosure away from a body of the enclosure when a force is applied to the proximal end of the pry bar, and
 wherein the pry bar hingedly moves in a first direction that is substantially orthogonal to a second direction in which the mounting support rotates.

2. The cover release mechanism of claim 1, wherein the hinge point is positioned along the pry bar closer to the distal end than the proximal end.

3. The cover release mechanism of claim 1, wherein the flange is for the body of the enclosure, wherein the opposing flange is for the cover of the enclosure, and wherein the distal end of the pry bar applies an opposing force to the opposing flange when the force is applied to the proximal end of the pry bar.

4. The cover release mechanism of claim 1, wherein the flange is for the cover of the enclosure, wherein the opposing flange is for the body of the enclosure, and wherein the distal end of the pry bar applies an opposing force to the opposing flange when the force is applied to the proximal end of the pry bar.

5. The cover release mechanism of claim 1, wherein the pry bar is positioned, using the mounting support, within the cavity when the pry bar is not in use.

6. The cover release mechanism of claim 1, wherein the enclosure is an explosion-proof enclosure.

* * * * *